US012601616B2

(12) United States Patent
Sabharwall et al.

(10) Patent No.: US 12,601,616 B2
(45) Date of Patent: Apr. 14, 2026

(54) FLUID FLOW SIMULATION DEVICES, FLUID HEATING CHAMBERS, AND ASSOCIATED METHODS

(71) Applicants:Battelle Energy Alliance, LLC, Idaho Falls, ID (US); University of Idaho, Moscow, ID (US); Paul Marotta, Jersey City, NJ (US)

(72) Inventors: Piyush Sabharwall, Idaho Falls, ID (US); Richard Christensen, Idaho Falls, ID (US); Paul Marotta, Jersey City, NJ (US); Kristen Geddes, Idaho Falls, ID (US); Alberto Cardenas-Melgar, Rexburg, ID (US); Robin Roper, Idaho Falls, ID (US)

(73) Assignees: Paul Marotta, Jersey, NJ (US); Battelle Energy Alliance, LLC, Idaho Falls, ID (US); University of Idaho, Moscow, ID (US)

( * ) Notice: Subject to any disclaimer, the term of this patent is extended or adjusted under 35 U.S.C. 154(b) by 581 days.

(21) Appl. No.: 17/935,861

(22) Filed: Sep. 27, 2022

(65) Prior Publication Data

US 2023/0101595 A1 Mar. 30, 2023

Related U.S. Application Data

(60) Provisional application No. 63/261,774, filed on Sep. 28, 2021.

(51) Int. Cl.
*G01D 11/24* (2006.01)
*G01F 3/38* (2006.01)

(52) U.S. Cl.
CPC ............... *G01D 11/24* (2013.01); *G01F 3/38* (2013.01)

(58) Field of Classification Search
CPC .................................. G01D 11/24; G01F 3/38
See application file for complete search history.

(56) References Cited

U.S. PATENT DOCUMENTS

| | | | |
|---|---|---|---|
| 3,030,293 A | 4/1962 | Wyatt | |
| 3,063,925 A | 11/1962 | Huet | |
| 3,177,123 A | 4/1965 | Huet | |
| 3,339,631 A | 9/1967 | McGurty et al. | |
| 3,378,453 A | 4/1968 | Gorker | |

(Continued)

FOREIGN PATENT DOCUMENTS

| | | | |
|---|---|---|---|
| DE | 202016102977 U1 | | 9/2017 |
| JP | 2004530044 A | * | 9/2004 |

(Continued)

OTHER PUBLICATIONS

Brzozowski et al., "Flow Chemistry: Intelligent Processing of Gas-Liquid Transformations Using a Tube-in-Tube Reactor", Accounts of Chemical Research, vol. 48, 2015, 14 pages.

(Continued)

*Primary Examiner* — Jamel E Williams
(74) *Attorney, Agent, or Firm* — TraskBritt

(57) ABSTRACT

A fluid flow simulation device may include a heating chamber configured to heat a conductive fluid with one or more electrodes. The fluid flow simulation device may also include a heat exchanger positioned over the heating chamber and a downcomer coupled between an outlet of the heat exchanger and a bottom of the heating chamber.

18 Claims, 7 Drawing Sheets

(56) References Cited

U.S. PATENT DOCUMENTS

| | | | |
|---|---|---|---|
| 3,420,737 A | 1/1969 | Marchal et al. | |
| 3,629,065 A | 12/1971 | Knox | |
| 4,132,115 A | 1/1979 | Benemann et al. | |
| 4,406,011 A | 9/1983 | Burns | |
| 4,853,177 A | 8/1989 | Pettus | |
| 5,130,082 A | 7/1992 | Oosterkamp | |
| 8,895,901 B2 * | 11/2014 | Wortmann | F24S 40/00 |
| | | | 219/535 |
| 8,974,556 B2 | 3/2015 | Tada et al. | |
| 10,043,594 B2 * | 8/2018 | Scott | G21C 1/22 |
| 10,170,207 B2 | 1/2019 | Bashkirtsev et al. | |
| 12,100,521 B2 * | 9/2024 | Carter | G21C 1/32 |
| 2003/0138244 A1 * | 7/2003 | Long | F24H 1/102 |
| | | | 392/480 |
| 2005/0072686 A1 * | 4/2005 | Shaw | C07C 1/26 |
| | | | 205/334 |
| 2011/0294083 A1 * | 12/2011 | Wiley | B01D 47/00 |
| | | | 432/5 |
| 2013/0083878 A1 * | 4/2013 | Massie | G21C 3/54 |
| | | | 376/458 |
| 2018/0330836 A1 | 11/2018 | Arafat et al. | |
| 2019/0237205 A1 * | 8/2019 | Abbott | G21C 1/03 |

FOREIGN PATENT DOCUMENTS

| | | | | | |
|---|---|---|---|---|---|
| JP | 5386346 B2 * | 1/2014 | | H05B 6/62 |
| KR | 20150058646 A * | 5/2015 | | |
| WO | 1999/059160 A1 | 11/1999 | | |
| WO | WO-2012105864 A1 * | 8/2012 | | F04B 15/06 |

OTHER PUBLICATIONS

Carter et al., Nuclear Reactor Flow Control Devices and Associated Reactors, Components, and Methods, U.S. Appl. No. 63/261,776, filed Sep. 28, 2021, 23 pages.

Chen et al., "Experimental Study on Start-Up and Steady State Characteristics of Passive Residual Heat Removal System for 2 MW Molten Salt Reactor", Energy, vol. 147, 2018, 13 pages.

Dong et al., "Experimental Investigation on the Heat Transfer Performance of Molten Salt Flowing in an Annular Tube", Experimental Thermal and Fluid Science, vol. 102, 2019, 10 pages.

Fenske et al., "The Macroscopic Behavior of Fast Reactor Fuel Subjected to Simulated Thermal Transients", Transactions of the American Nuclear Society, vol. 45, Jun. 1983, 6 pages.

Litchford et al., "Design of a Resistively Heated Thermal Hydraulic Simulator for Nuclear Rocket Reactor Cores", Collection of Technical Papers, 43rd AIAA/ASME/SAE/ASEE Joint Propulsion Conference, vol. 6, 2007, 13 pages.

Muhammad et al., "Fully Developed Darcy-Forchheimer Mixed Convective Flow Over a Curved Surface With Activation Energy and Entropy Generation", Computer Methods and Programs in Biomedicine, vol. 188, 2020, 6 pages.

Perlmutter et al., "Unsteady Laminar Flow in a Duct With Unsteady Heat Addition", Journal of Heat Transfer, Transactions of the ASME, vol. 83, Nov. 1961, 9 pages.

Sparrow et al., "Laminar Flow of a Heat-Generating Fluid in a Parallel-Plate Channel", A.I.Ch.E. Journal, vol. 9, No. 6, Nov. 1963, 8 pages.

Srivastava et al., "Experimental and Theoretical Studies on the Natural Circulation Behavior of Molten Salt Loop", Applied Thermal Engineering, vol. 98, 2016, 9 pages.

Yang et al., "Mass Transport and Reactions in the Tube-in-Tube Reactor", Organic Process Research & Development, vol. 17, 2013, 7 pages.

Sabharwall et al., Liquid Fuel Nuclear Power Generation Devices and Associated Components and Systems, U.S. Appl. No. 63/261,775, filed Sep. 28, 2021, 36 pages.

* cited by examiner

102

214

302

308

202

216

204

206

106

104

FLUID FLOW SIMULATION DEVICES, FLUID HEATING CHAMBERS, AND ASSOCIATED METHODS

CROSS-REFERENCE TO RELATED APPLICATION

This application claims the benefit under 35 U.S.C. § 119(e) of U.S. Provisional Patent Application Ser. No. 63/261,774, filed Sep. 28, 2021, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure generally relate to fluid flow simulation devices. In particular, embodiments of the present disclosure relate to thermal fluid flow simulation devices and associated chambers and methods.

BACKGROUND

Thermal fluid flow or natural convection may be used to move a fluid through a system. For example, some nuclear systems may use thermal fluid circulation to move a cooling fluid or a liquid fuel through the system. Many systems that use thermal fluid circulation may operate at high temperatures and/or pressures. In some cases, such as nuclear systems, system failures may have expensive and sometimes dangerous results, such that testing and/or validation in less volatile systems may help to prevent system failures in more critical equipment. Therefore, flow simulation systems may be developed to simulate the changes in temperature and flow rates using lower temperature fluids and lower pressures. The simulation systems may be used to validate engineering models and/or software simulations.

SUMMARY

Embodiments of the disclosure may include a fluid flow simulation device. The device may include a heating chamber comprising one or more electrodes and a conductive fluid. The device may further include a heat exchanger positioned over the heating chamber. The device may also include a downcomer coupled between an outlet of the heat exchanger and a bottom of the heating chamber.

Other embodiments of the disclosure may include a fluid heating chamber. The chamber may include a salt water solution comprising a salt concentration of at least 25 wt %. The chamber may further include one or more electrodes positioned within the fluid heating chamber, the one or more electrodes configured to induce a current through the salt water solution to heat the salt water solution.

Other embodiments of the disclosure may include a method of simulating fluid flow. The method may include heating a conductive fluid in a heating chamber by generating a current through the conductive fluid with one or more electrodes. The method may further include allowing the heated conductive fluid to rise through the heating chamber. The method may also include removing heat from the conductive fluid with a heat exchanger positioned above the heating chamber. The method may further include allowing the cooled conductive fluid to travel downward in an outer fluid passage outside the heating chamber.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
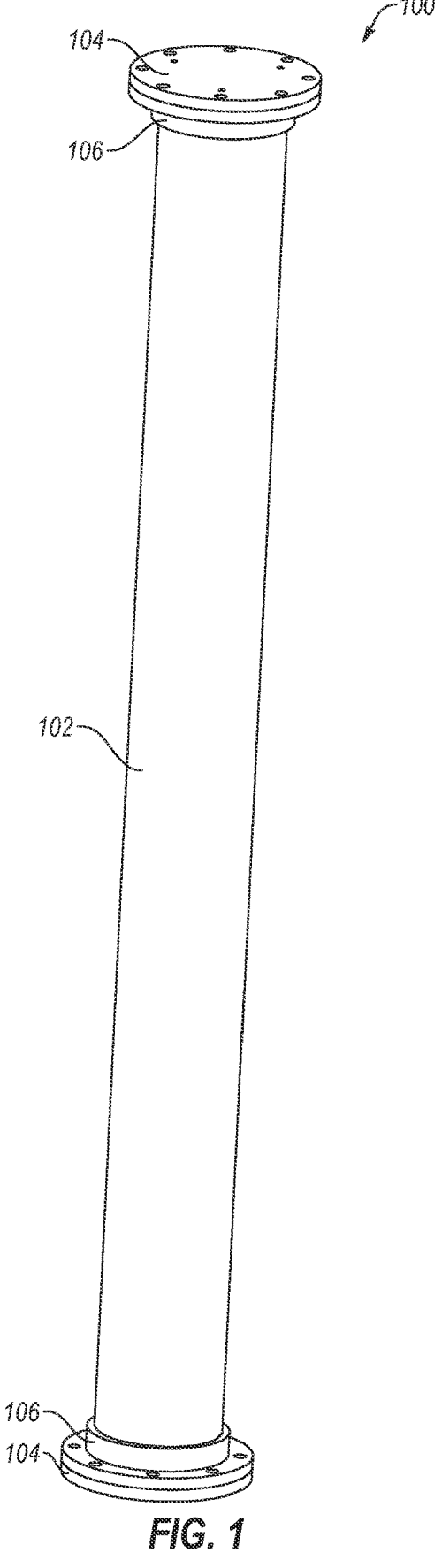
FIG. 1 illustrates a perspective view of a fluid flow simulation device in accordance with one or more embodiments of the present disclosure.

The illustrations presented herein are not meant to be actual views of any particular fluid flow simulation device or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the terms "fluid flow simulation device" refer to a device configured to initiate fluid flow in a system in a non-hostile environment, such as an environment having low temperatures, low pressures, low radiation, low reactivity, etc., to simulate fluid flow in a hostile environment, such as fluid flow through a nuclear reactor, fluid flow generated by the heating of nuclear fuel within a reactor, etc.

As described above, fluid flow simulation devices may be used to simulate fluid flow through a system at lower temperatures and pressures than the final system. For example, nuclear energy production devices may generate substantial amounts of radiation and heat, requiring significant amounts of shielding. Furthermore, any sensors in or around the nuclear energy production devices would need to be designed to withstand the heat and radiation. Testing fluid flow in a system may require significant numbers of sensors and access to the system. Therefore, it may not be safe to use nuclear energy production devices in the early stages of testing due at least to the limited accessibility and specialized sensors. Furthermore, nuclear energy production devices may require advanced materials, which may increase the cost of building the reactors.

A simulation device that can generate similar temperature differentials in a fluid without the use of expensive materials, high temperatures, and radiation may enable fluid flow models to be validated at a lower cost and in safer conditions. Furthermore, the ability to observe the fluid flow without needing to remove shielding may enable higher levels of validation beyond sensor validation.

Many simulation devices utilize heating elements within the fluid to generate the temperature differentials of the fluid to simulate the fluid flow. The heating elements may heat the fluid by transferring heat from the heating element to the fluid. However, in a liquid fuel nuclear system, the fluid is not heated by a heating element, such as a fuel rod, rather, the liquid fuel is heated through nuclear reactions within the fluid. Therefore, to provide a more accurate simulation of the fluid flow within a liquid fuel nuclear reactor the simulation fluid may be heated by exciting electrons within the fluid without heat transfer from a separate heating element.

FIG. 1 illustrates a simulation device 100. The simulation device 100 may be configured to simulate a molten salt nuclear battery having a substantially tubular design, such as the molten salt nuclear battery described in the U.S. Provisional Patent Application 63/261,775 titled LIQUID FUEL NUCLEAR POWER GENERATION DEVICES AND ASSOCIATED COMPONENTS AND SYSTEMS, filed Sep. 28, 2021, and the U.S. Patent Application titled LIQUID FUEL NUCLEAR POWER GENERATION DEVICES AND ASSOCIATED SYSTEMS AND METHODS, filed on even date herewith, the disclosure of each of which are incorporated herein in their entirety by this reference.

The simulation device 100 may be configured to have similar geometry to the device being simulated. For example, the geometry of the simulation device 100 may be dimensionally the same as the device being simulated. In some embodiments, the geometry of the simulation device may be proportionally the same as the device being simulated. For example, a height to diameter ratio of the simulation device 100 may be substantially the same as the device being simulated, such that a shorter simulation device 100 may have a smaller diameter as well. In other embodiments, a critical dimension may be determined such that the critical dimension of the simulation device 100 and the device being simulated may be substantially the same, with the other dimensions being approximated in a manner that may reduce cost or facilitate easier construction and/or workability. For example, if the height is determined to be a critical dimension and the diameter is determined to be less critical to performance, the simulation device 100 may be constructed to substantially match a height of the device being simulated and a diameter of the simulation device 100 may be constructed to diameters available in off-the-shelf materials, such that the cost of procuring parts for the simulation device 100 may be reduced. The geometry of the simulation device 100 may minimize the pressure drop, enabling natural circulation within the simulation device 100.

As illustrated in FIG. 1, the simulation device 100 may include a case 102 extending between two end caps 104. The case 102 may have a substantially tubular structure. For example, the case 102 may be a substantially cylindrical tube as illustrated in FIG. 1. In other embodiments, the case 102 may have other tubular geometries, such as a rectangular tube, a triangular tube, etc. The end caps 104 may have a complementary geometry configured to enclose the inner portion of the case 102. For example, the end caps 104 may have substantially the same shape as a cross-section of the case 102, with a larger major dimension (e.g., diameter, width, apothem, radius, etc.). The case 102 may also include flanges 106 on the ends of the case 102 configured to create a mounting point between the case 102 and the end caps 104. The flanges 106 may include interfacing elements, such as interfacing hardware, such as studs or pins and/or interfacing geometry, such as holes, threaded inserts, threaded holes, etc.

Figure 2:
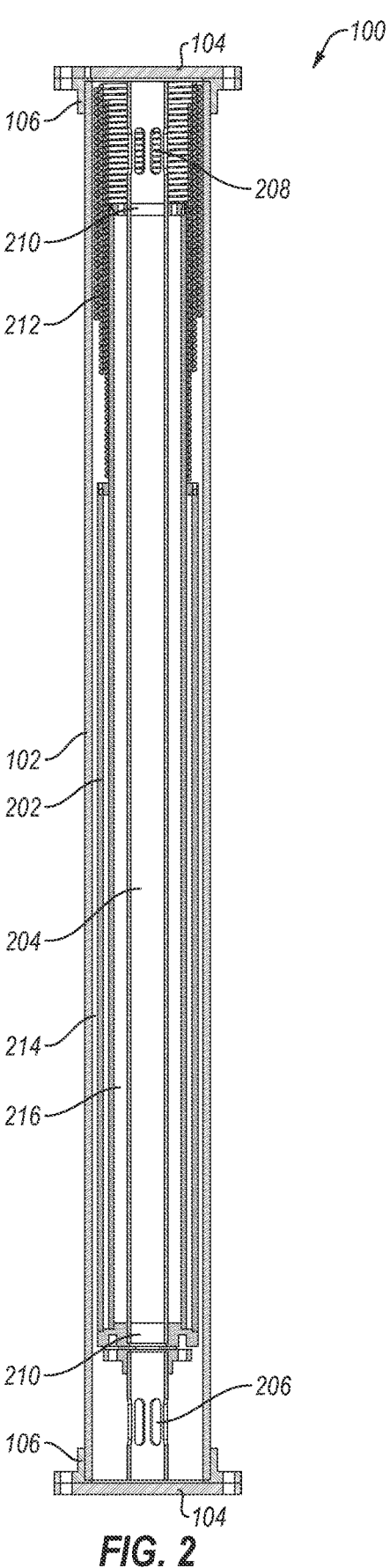
FIG. 2 illustrates a cross section view of the fluid flow simulation device of FIG. 1.

FIG. 2 illustrates a cross-section view of the simulation device 100. The case 102 may be a hollow tube housing multiple additional nested tubes to create a tube within a tube structure. In some embodiments, one or more of the case 102 and the nested tubes may be formed from a substantially transparent material, such that the fluid flow within the different portions of the simulation device 100 may be visually observed. In other embodiments, the nested tubes may include windows. The different portions of the simulation device 100 may also include one or more sensors, such as temperature sensors, thermocouples, pressure sensors, flow sensors, strain sensors, etc., configured to measure properties of the fluid within the simulation device 100 and/or properties of the structure of the simulation device 100.

The simulation device 100 may include a heating chamber 204 positioned near a center of the case 102. The heating chamber 204 may be a tubular structure having a cross-section that is substantially similar to a cross-section of the case 102 with a smaller major dimension. The heating chamber 204 may have the smallest major dimension of the nested tubes, such that the heating chamber 204 may be the innermost of the nested tubes. The heating chamber 204 may include a fluid inlet 206 near a bottom portion of the heating chamber 204 and a fluid outlet 208 near a top portion of the heating chamber 204. The heating chamber 204 may also include one or more electrodes 210 positioned within the heating chamber 204.

The electrodes 210 may be configured to generate or induce a current through a fluid within the heating chamber 204 by creating a voltage differential across the fluid, such as between two electrodes 210. The simulation fluid (e.g., working fluid) of the simulation device 100 may be a conductive fluid (e.g., an ionized fluid capable of carrying a current), such as a salt water solution. In some embodiments, the simulation fluid may be a salt water solution having a salt content (e.g., salt concentration) of greater than about 1 wt %, and a maximum concentration of the salt saturation conditions for the operating conditions of the unit, i.e., temperature and pressure, or other suitable conducting fluid. For example, the salt concentration may be less than about 25 wt %, such as between about 1 wt % and about 25 wt %. The salt content may enable the electrodes 210 to generate a current through the simulation fluid. Higher salt contents may reduce the voltage that is used to generate the current. The simulation fluid may be enclosed within the case 102 and configured to pass through the heating chamber 204. The current passing through the simulation fluid may cause the simulation fluid to increase in temperature. Heating the simulation fluid by passing a current through the fluid may substantially mimic the fluid behavior of a nuclear molten salt solution, such as a solutions of fluorine and uranium, fluorine and thorium, chlorine and uranium, chlorine and thorium, etc. Nuclear reactions within the nuclear molten salt solution may internally heat the nuclear molten salt solution similar to the internal heat generated by passing a current through the simulation fluid.

A substantially accurate simulation may be created by substantially matching a volumetric energy generation rate (e.g., the amount of heat generated in the fluid per volume of the fluid). For example, a simulation device 100 configured to simulate a molten salt nuclear reactor may be configured to generate heat within the simulation fluid at a rate of between about 0.5 Megawatts/meter3 (MW/m3) and about 3 MW/m3, such as about 1 MW/m3. The volumetric energy generation rate may be controlled by adjusting the voltage provided to the one or more electrodes 210 and/or by changing the number of active electrodes 210 within the heating chamber 204. For example, increasing a voltage provided to the active electrodes 210 may increase the energy generation rate. Increasing the number of active electrodes 210 within the heating chamber 204 may also increase the energy generation rate without increasing the voltage.

As the simulation fluid is heated within the heating chamber 204, an upward flow may be created as the warmer fluid rises in the heating chamber 204. The upward flow may be characterized as natural convection. The upward flow may be driven by a temperature difference between the fluid entering the heating chamber 204 through the fluid inlets 206 and the fluid exiting the heating chamber 204 through the fluid outlets 208. The heating chamber 204 may be configured to achieve a temperature difference of between about 1° C. and about 100° C., such as between about 5° C. and about 50° C. The flow velocity of the fluid through the heating chamber 204 may affect the temperature differential. The difference between the flow velocities may affect the amount of time that the fluid spends in the heating chamber 204. For example, a high flow velocity may be in the heating chamber 204 for a shorter amount of time such that the fluid may not absorb as much energy as a slower moving fluid. The reduction in energy imparted to the fluid may result in a lower temperature differential than the slower moving fluid. This may also be similar to a molten salt nuclear reactor, where a higher flow rate through the reactor may result in fewer reactions and a lower temperature differential. The simulation device 100 may be configured to measure a temperature differential between the fluid inlets 206 and the fluid outlets 208. The simulation device 100 may be configured to compare the measured temperature differential to a temperature differential threshold and adjust the voltage applied to the electrodes 210 to change the temperature differential. The temperature differential threshold may be determined based on an expected or desired temperature differential for the nuclear reactor being simulated. The simulation fluid may rise within the heating chamber 204 until it reaches an upper portion of the heating chamber 204, where the simulation fluid may exit the heating chamber 204 through fluid outlets 208 in the heating chamber 204. The fluid outlets 208 may be openings or passages formed in the wall of the heating chamber 204. The fluid outlets 208 may be arranged radially about the top portion of the heating chamber 204, such that the simulation fluid may exit the heating chamber 204 in substantially all radial directions.

The upper portion of the heating chamber 204 may be surrounded by a heat exchanger 212. The heat exchanger 212 may include multiple coils configured to extract heat from the simulation fluid as described in further detail below. The simulation fluid may exit the heating chamber 204 and pass through the heat exchanger 212. As the simulation fluid passes through the heat exchanger 212 the simulation fluid may be cooled. The cooled simulation fluid may begin to travel downward again through natural convection.

The simulation device 100 may include an inner case 202 positioned between the case 102 and the heating chamber 204. The inner case 202 may be configured to define a fluid passage 214 (e.g., downcomer) between the inner case 202 and the case 102. The simulation fluid may travel through the fluid passage 214 to a bottom portion of the simulation device 100 after being cooled in the heat exchanger 212. In some embodiments, the fluid passage 214 may be one or more tubes coupled between the heat exchanger 212 and the bottom of the simulation device 100. The inner case 202 may also define an insulated space 216 between the fluid passage 214 and the heating chamber 204. The insulated space 216 may be configured to substantially limit the transfer of heat from the heating chamber 204 to the simulation fluid traveling through the fluid passage 214. In some embodiments, the insulated space 216 may be an air gap between the inner case 202 and the heating chamber 204. In other embodiments, the insulated space 216 may be filled with an insulating material, such as foam, fiberglass, etc.

When the simulation fluid reaches the bottom portion of the simulation device 100, the fluid may re-enter the heating chamber 204 through fluid inlets 206 positioned in a bottom portion of the heating chamber 204. The fluid inlets 206 may be openings or passages formed in the wall of the heating chamber 204. The fluid inlets 206 may be arranged radially about the bottom portion of the heating chamber 204, such that the simulation fluid may enter the heating chamber 204 from substantially all radial directions.

Figure 3:
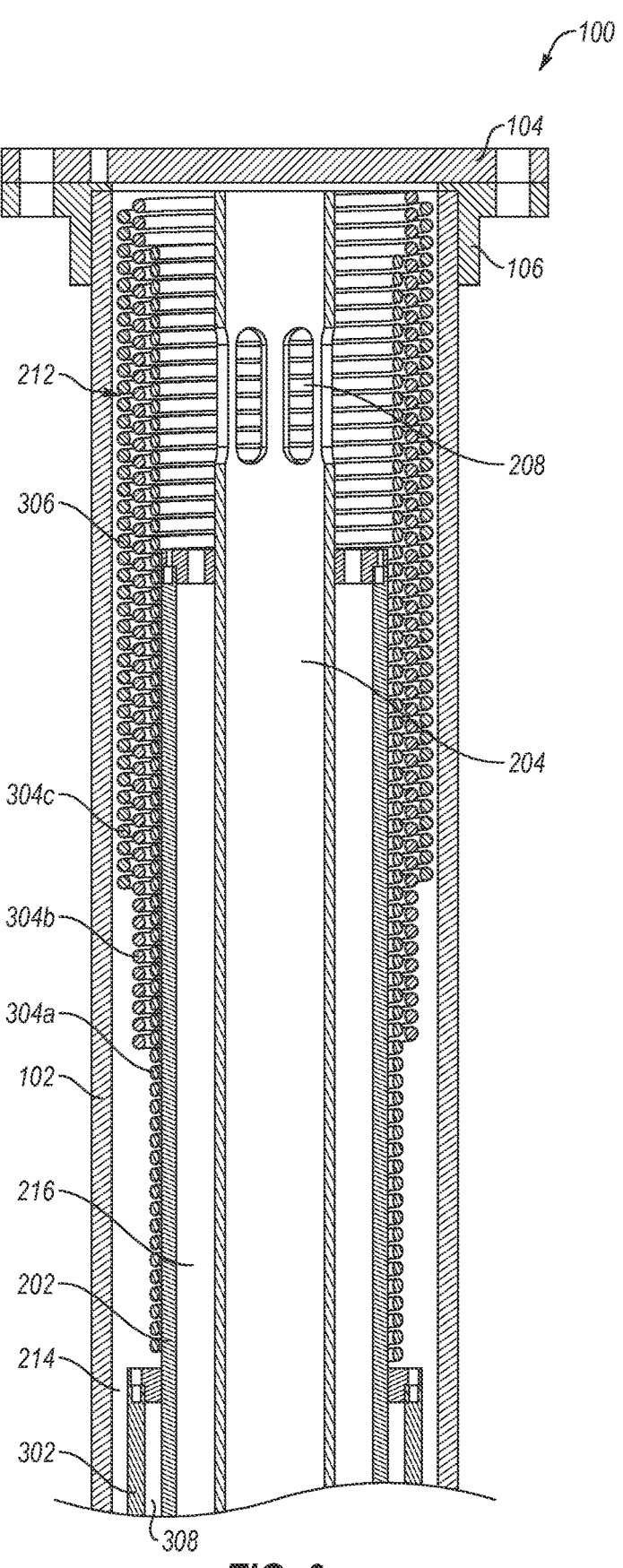
FIG. 3 illustrates a cross-sectional view of a top portion of the fluid flow simulation device of FIGS. 1 and 2.
Figure 4:
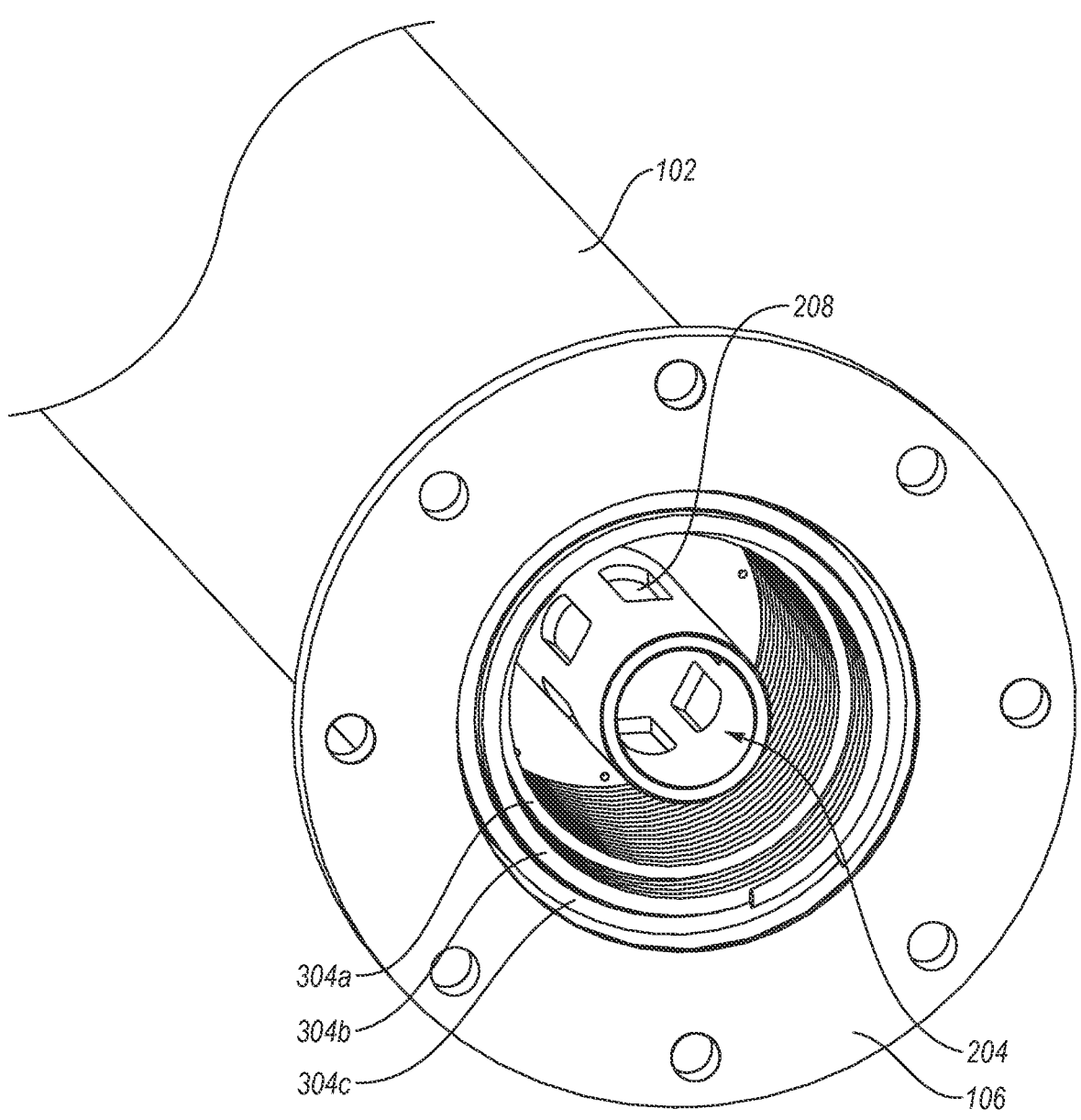
FIG. 4 illustrates a perspective view of the top portion of the fluid flow simulation device of FIGS. 1-3 with a cover removed.

FIG. 3 and FIG. 4 illustrate views of the upper portion of the simulation device 100. As described above, the heated simulation fluid may exit the heating chamber 204 through fluid outlets 208 positioned radially about the heating chamber 204. The fluid may then pass through the heat exchanger 212. The heat exchanger 212 may include one or more rows of tubes 304a-304c. For example, the heat exchanger 212 may include a first row of tubes 304a, a second row of tubes 304b, and a third row of tubes 304c. Each row of tubes 304a-304c may be formed from one or more tubes 306 formed into a coil substantially surrounding the heating chamber 204. The one or more tubes 306 may be filled with a cooling fluid, such as water or refrigerant. The cooling fluid may flow through the one or more tubes 306 removing heat from the one or more tubes 306. The cooling fluid may then be cooled through a separate heat removal device, such as a fin tube heat exchanger, a plate heat exchanger, a chiller, a refrigeration loop, etc.

The tubes 306 in each row of tubes 304a-304c may be spaced such that the simulation fluid may pass between the tubes 306. If the heat exchanger 212 includes multiple rows of tubes 304a-304c as illustrated in FIG. 3 and FIG. 4, the rows of tubes 304a-304c may also be spaced, such that the simulation fluid may pass between the rows of tubes 304a-304c. The rows of tubes 304a-304c may have different numbers of coils. For example, the first row of tubes 304a may include a larger number of coils of tubes 306 than the second row of tubes 304b or the third row of tubes 304c. The number of coils of tubes 306 may reduce as the row of tubes 304a-304c gets farther from the heating chamber 204. For example, as the simulation fluid travels a greater distance from the heating chamber 204 through the heat exchanger 212 the amount of heat to be removed from the simulation fluid may be reduced at least due to the amount of heat that the rows of tubes 304a-304c positioned nearer to the heating chamber 204 have already removed. Furthermore, the first row of tubes 304a may also be configured to remove additional heat that may be transferred from the heating chamber 204 to the simulation fluid through the insulated space 216 and the inner case 202, at least in the upper region of the heating chamber 204 where the temperatures in the heating chamber 204 may be the highest.

The simulation device 100 may include a second inner case 302 in the area of the fluid passage 214 below the heat exchanger 212. The second inner case 302 may define an additional insulated space 308 between the inner case 202 and the fluid passage 214. The additional insulated space 308 may further limit heat transfer from the 204 to the fluid passage 214.

Figure 5:
FIG. 5 illustrates a sectional view of a bottom portion of the fluid flow simulation device of FIGS. 1-4.
Figure 6:
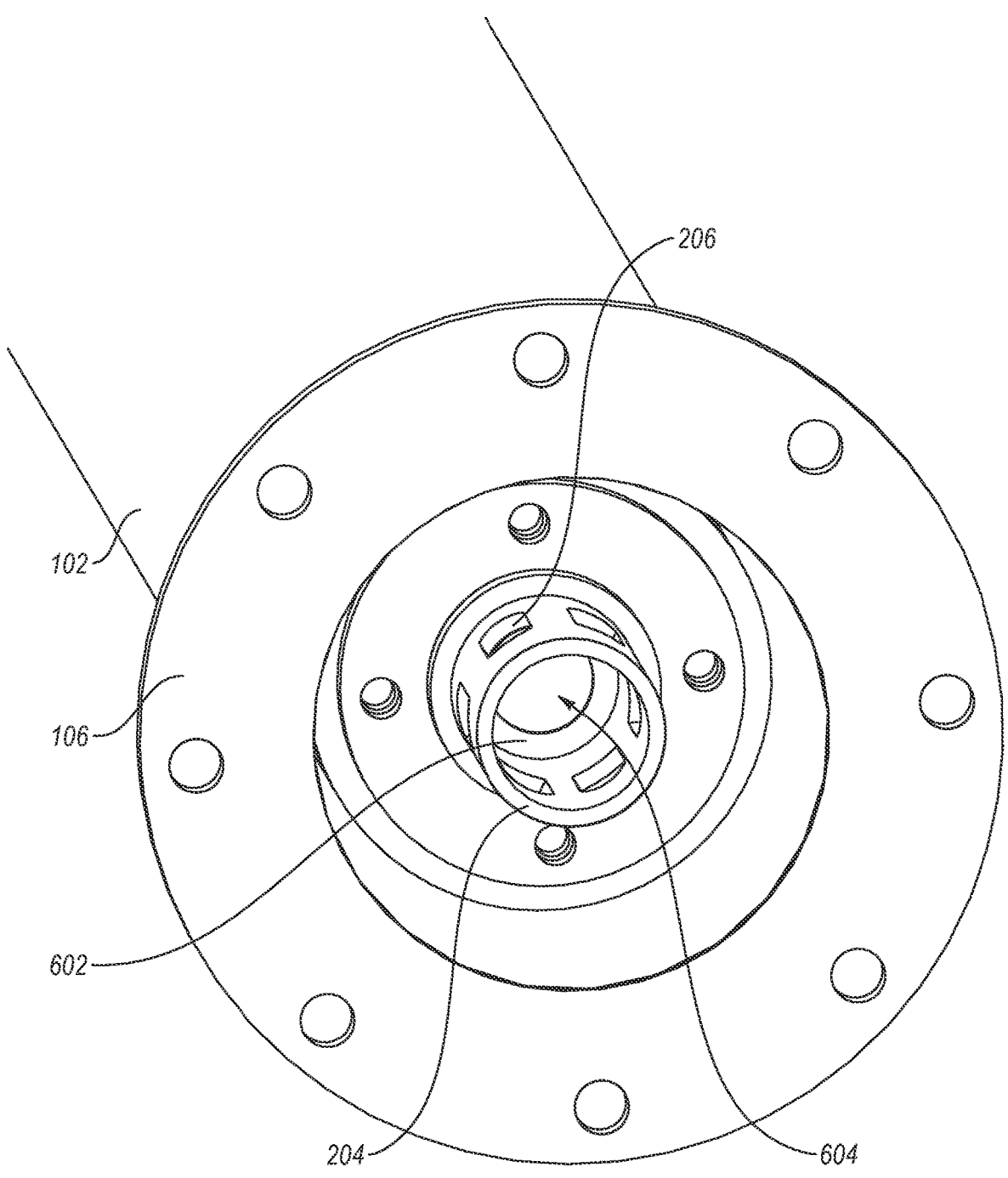
FIG. 6 illustrates a perspective view of the bottom portion of the fluid flow simulation device of FIGS. 1-5.

FIG. 5 and FIG. 6 illustrate views of the lower portion of the simulation device 100. As described above, the simulation fluid may travel through the fluid passage 214 to the lower portion of the simulation device 100. The end cap 104 on the bottom end of the case 102 may stop the downward flow of the simulation fluid. The simulation fluid may then flow through the fluid inlets 206 back into the heating chamber 204. The heating chamber 204 may include an orifice plate 602. The orifice plate 602 may include one or more orifices 604 in the orifice plate 602 through which the simulation fluid may pass. The orifice plate 602 may be configured to control the flow of the simulation fluid through the heating chamber 204. For example, the orifice plate 602 may be configured to substantially prevent turbulent flow and/or the formation of vortices in the heating chamber 204. In some embodiments, the orifice plate 602 may be configured to regulate the flow velocity of the simulation fluid. In some embodiments, the orifice plate 602 may be adjustable, such as to change the flow velocity between simulations or mid simulation.

Figure 7A:
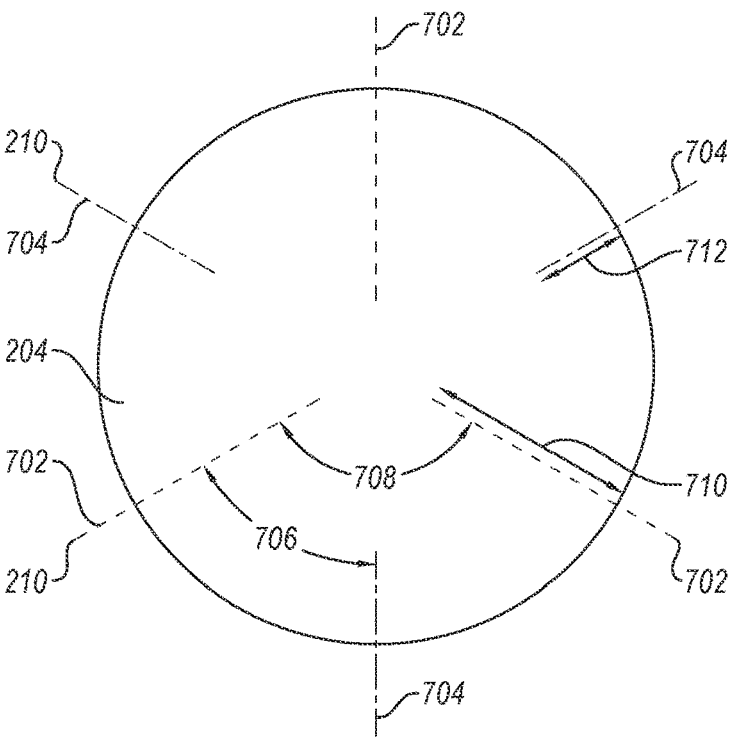
FIG. 7A illustrates a cross sectional view of a heating chamber of the simulation device of FIGS. 1-6.
Figure 7B:
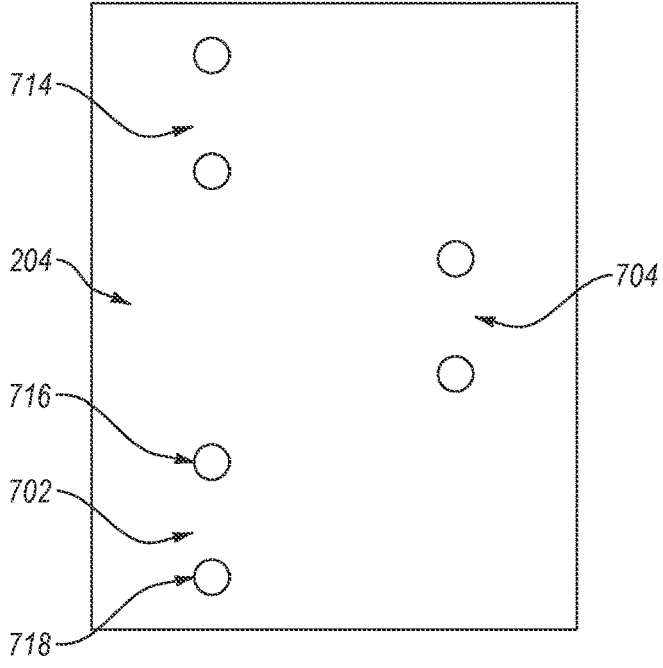
FIG. 7B illustrates a schematic view of an electrode arrangement in the heating chamber of FIG. 7A.

FIGS. 7A and 7B illustrate different views of an electrode arrangement in the heating chamber 204 of the simulation device 100. FIG. 7A illustrates a cross-sectional view of the heating chamber 204. FIG. 7B illustrates a schematic side view of the heating chamber 204. The heating chamber 204 may include multiple electrodes 210 spaced throughout the heating chamber 204 to generate heat in the simulation fluid.

The electrodes 210 may be arranged in electrode sets 702, 704, 714. Each electrode set 702, 704, 714 may include multiple electrodes 210 angularly spaced about the heating chamber 204. FIG. 7A illustrates two electrode sets 702, 704. The first electrode set 702 may include at least two electrodes 210, such as three electrodes 210, as illustrated in FIG. 7A. In other embodiments, the first electrode set 702 may include a different number of electrodes 210, such as two electrodes 210, four electrodes 210, or greater than four electrodes 210. The electrodes 210 of the first electrode set 702 may be arranged with substantially uniform angular spacing. For example, an angle 708 between two adjacent electrodes 210 of the first electrode set 702 may be about 120° when the first electrode set 702 includes three electrodes 210 as illustrated in FIG. 7A. In an embodiment, with four electrodes 210, the angle 708 between two adjacent electrodes 210 may be about 90°.

A second electrode set 704 may be positioned a distance away from the first electrode set 702. The second electrode set 704 may be spaced both vertically and angularly from the first electrode set 702. For example, as illustrated in FIG. 7A, the second electrode set 704 may include a similar arrangement of electrodes 210 (e.g., similar number of electrodes 210 and a similar spacing between electrodes 210). The second electrode set 704 may however, be angularly offset from the first electrode set 702 by an angle 706. For example, the angle 706 may be less than the angle 708 between individual electrodes 210 of the first electrode set 702, such that the electrodes 210 of the second electrode set 704 may be positioned angularly between the electrodes 210 of the first electrode set 702. In some embodiments, the angle 706 may be about one half of the angle 708, such that the electrodes 210 of the second electrode set 704 may be positioned to bisect the angle 708 between the electrodes 210 of the first electrode set 702.

The second electrode set 704 may also be spaced vertically from the first electrode set 702 as illustrated in FIG. 7B. The vertical spacing between each of the first electrode set 702, the second electrode set 704, and the third electrode set 714 may distribute electrical current throughout the heating chamber 204 generating greater amounts of heat in the simulation fluid within the heating chamber 204. The vertical positions of the electrode sets 702, 704, 714 may be determined to approximate the releases of energy in a nuclear reactor. For example, models of a core of a nuclear reactor may predict zones that are hotter than other zones (e.g., having a larger number of reactions), such as due to delayed release neutrons. The electrode sets 702, 704, 714 may be positioned to approximate the vertically locations of the hotter zones.

Each electrode set 702, 704, 714 may include two sets of electrodes 210, a primary electrode set 716 and a secondary electrode set 718. The primary electrode set 716 may be a set of source electrodes 210 coupled to a positive side of the power source and the secondary electrode set 718 may be a set of receiving electrode 210 coupled to a negative side of the power source. The primary electrode set 716 and the secondary electrode set 718 may be configured to generate a current between the primary electrode set 716 and the secondary electrode set 718 through the simulation fluid. The primary electrode set 716 and the secondary electrode set 718 may be spaced vertically in the heating chamber 204 as illustrated in FIG. 7B. The vertical spacing between the primary electrode set 716 and the secondary electrode set 718 may be configured to provide substantial space for the current between the primary electrode set 716 and the secondary electrode set 718 to generate heat within the simulation fluid while being sufficiently close together that the current may be generated with an easily accessible voltage, such as line voltage (e.g., 120 V, 220 V, 277 V, 408 V, etc.). The vertical spacing may be determined based on factors such as the available voltage, the composition of the simulation fluid, safety considerations, etc.

In some embodiments, the individual electrode sets 702, 704, 714 may include electrodes 210 having different lengths. For example, the first electrode set 702 may have electrodes 210 with a first length 710 and the second electrode set 704 may have electrodes 210 with a second length 712 as illustrated in FIG. 7A. The different lengths 710, 712 may generate heat in different portions of the simulation fluid. For example, the electrodes 210 of the first electrode set 702 may have a first length 710 that is greater than the second length 712 of the electrodes 210 in the second electrode set 704. The greater first length 710 of the electrodes 210 in the first electrode set 702 may generate a current in a portion of the simulation fluid radially closer to a center of the heating chamber 204 than the electrodes 210 of the second electrode set 704. This may result in a more uniform heat distribution throughout the simulation fluid in the heating chamber 204.

The embodiments of the present disclosure may provide a less expensive simulation device for simulating natural convection flow within a liquid fuel nuclear reactor. Embodiments of the present disclosure may be configured to simulate the generation of heat within a liquid rather than the transfer of heat to a liquid. This may provide a more accurate representation of a liquid fuel nuclear reactor. The cost of the simulation device may be substantially lower than the cost of building a liquid fuel nuclear reactor. Furthermore, embodiments of the present disclosure may not include moving components, such as pumps, valves, compressors, etc., such that the embodiments of the present disclosure may be less complicated and have higher efficiencies. The lower costs of building and/or operating the simulation devices may enable greater amounts of testing and/or validation of the far more expensive nuclear reactors, which may ultimately reduce the cost of producing a fully functional liquid fuel nuclear reactor.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A fluid flow simulation device comprising:
   a heating chamber comprising one or more electrodes, a conductive fluid, and an orifice plate configured to control flow of the conductive fluid through the heating chamber;
   a heat exchanger positioned over the heating chamber; and
   a downcomer coupled between an outlet of the heat exchanger and a bottom of the heating chamber.

2. The fluid flow simulation device of claim 1, wherein the conductive fluid comprises a salt water solution including less than about 25 wt % salt.

3. The fluid flow simulation device of claim 1, wherein the orifice plate is adjustable.

4. The fluid flow simulation device of claim 1, wherein the heating chamber and the downcomer comprise nested tubes.

5. The fluid flow simulation device of claim 4, wherein the heating chamber comprises a first tube and the heat exchanger and the downcomer comprise a second tube, the first tube being separate from the second tube.

6. The fluid flow simulation device of claim 4, wherein the heating chamber comprises a first tube and the downcomer comprises a second tube, the first tube nested within the second tube.

7. A fluid heating chamber comprising:
   a salt water solution comprising a salt concentration of less than about 25 wt %; and
   one or more electrodes positioned within the fluid heating chamber, the one or more electrodes configured to induce a current through the salt water solution to heat the salt water solution and induce upward flow of the salt water solution through natural circulation.

8. The fluid heating chamber of claim 7, wherein the one or more electrodes are configured to generate heat in the salt water solution at a rate of between about 0.5 MW/m$^3$ and about 3 MW/m$^3$.

9. The fluid heating chamber of claim 7, wherein a tubular structure defines the fluid heating chamber.

10. The fluid heating chamber of claim 9, further comprising an inlet positioned on a first end of the tubular structure and an outlet positioned on a second opposite end of the tubular structure.

11. The fluid heating chamber of claim 10, wherein the inlet comprises an orifice plate configured to control flow of the salt water solution entering the fluid heating chamber through the inlet.

12. The fluid heating chamber of claim 11, wherein the orifice plate is adjustable.

13. A method of simulating fluid flow comprising:
   heating a conductive fluid in a heating chamber by generating a current through the conductive fluid with one or more electrodes;
   allowing the heated conductive fluid to rise through the heating chamber through natural circulation;
   removing heat from the conductive fluid with a heat exchanger positioned above the heating chamber; and
   allowing the cooled conductive fluid to travel downward in an outer fluid passage outside the heating chamber.

14. The method of claim 13, wherein generating the current through the conductive fluid comprises applying a voltage between two electrodes of the one or more electrodes.

15. The method of claim 13, wherein heating the conductive fluid comprises generating a temperature differential in a range from about 1° C. to about 100° C. between an inlet temperature entering the heating chamber and an outlet temperature exiting the heating chamber.

16. The method of claim 13, further comprising measuring a temperature and a pressure of the conductive fluid in at least one position in the heating chamber.

17. The method of claim 13, further comprising measuring a temperature differential of the conductive fluid between an inlet temperature entering the heating chamber and an outlet temperature exiting the heating chamber.

18. The method of claim 17, further comprising adjusting the current through the conductive fluid to control the temperature differential to a threshold temperature differential.

* * * * *